May 23, 1939.    I. B. LAWYER    2,159,559
FEEDING MECHANISM FOR PLASTIC EXTRUSION MOLDING MACHINES
Filed April 26, 1937    2 Sheets-Sheet 1

INVENTOR
IRA B. LAWYER
BY
Toulmin & Toulmin
ATTORNEYS

INVENTOR
IRA B. LAWYER
BY
ATTORNEYS

Patented May 23, 1939

2,159,559

UNITED STATES PATENT OFFICE 2,159,559

FEEDING MECHANISM FOR PLASTIC EXTRUSION MOLDING MACHINES

Ira B. Lawyer, Mount Gilead, Ohio, assignor to The Hydraulic Press Corp. Inc., Wilmington, Del., a corporation of Delaware Application April 26, 1937, Serial No. 138,944

9 Claims. (Cl. 18—30)

This invention relates to plastic extrusion molding machines, and in particular, to feeding devices for such machines.

One object of this invention is to provide a motor-driven feeding device wherein a positively driven feeding member cooperates with gravity in feeding the material.

Another object is to provide a motor-driven feeding device wherein the feeding mechanism is operated electrically and controlled by the energization and deenergization of an electric circuit.

Another object is to provide a feeding and injection device for a plastic extrusion molding machine, wherein the injecting member operates an electric switch which controls the energization of a circuit operating the feeding member of the feeding mechanism.

Another object is to provide a feeding and injection device, wherein a feed screw supplies material to the injection chamber and is operated by a motor in a circuit controlled by a switch adapted to be shifted in response to the travel of the injection member.

Another object is to provide a feeding and injection device, as described in the preceding paragraph, wherein means is provided for supplying an amount of material slightly in excess of the required amount, and enabling the feeding mechanism to be deenergized and rendered inoperative when the accumulation of material in the injector exceeds a predetermined amount.

Another object is to provide a feeding and injection device, as described above, wherein the circuit for energizing the operation of the feed screw is controlled by a single limit switch operated in response to the travel of the injection member.

Another object is to provide a feeding and injection device, as previously described, wherein a timing arrangement is set in motion and controls the length of time, and hence, the quantity of material which the feeding member feeds to the injector.

Another object is to provide a feeding and injection device, wherein the feeding member, such as a screw, feeds the material into a vertical chute opening into the injection chamber, in such a manner that excess material may accumulate in the chute.

General construction

In general, the feeding and injection device of this invention consists of an injector having a chamber with an injection plunger reciprocating therein, this plunger being preferably operated by fluid pressure. Opening into the injection chamber is a vertical passageway or chute communicating with a substantially horizontal feeding chamber having a feed screw rotated therein by means of an electric motor. A molding material hopper opens into the feeding chamber. The feeding motor is controlled by a magnetic motor switch, which in turn, is energized by the cooperative working of an electrical timing switch and a limit switch actuated in response to the travel of the injection plunger. This limit switch is normally open, and is closed when the injection plunger reaches a predetermined position, thereby energizing the motor circuit and starting the timing device, which after a predetermined period, opens the circuit and deenergizes the motor.

Injector construction

Figure 1:
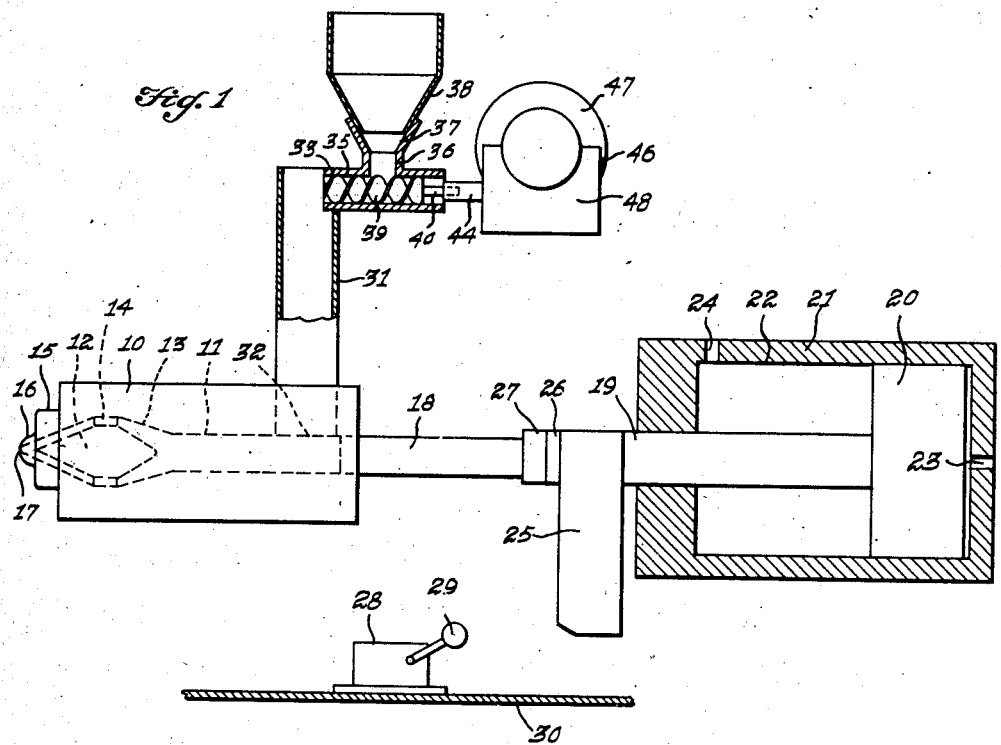
Figure 1 is a diagrammatic view, partly in section, of the feeding and injection device of this invention.

Referring to the drawings in detail, Figure 1 shows the feeding and injection device of this invention as including an injector, generally designated 10, having an injector chamber 11 with a spindle-shaped plastic material deflector 12, spaced from the chamber enlargement 13 by the spacing portions 14. Beyond the deflector 12 and the chamber enlargement 13 there is mounted a nozzle 15 having a tip 16 with an aperture 17 for the extrusion of the plastic molding material. The injector 10 is heated by any suitable means (not shown), such as by an electrical heating coil or by a hollow chamber or jacket containing circulating hot oil.

The injector chamber 11 is arranged to receive an injection plunger 18, continuing in an enlarged piston rod 19 with a piston head 20 mounted thereon and reciprocating in a cylinder 21 with a bore 22, reached by the ports 23 and 24, respectively. Mounted between the piston rod 19 and the injection plunger 18 is a cam member 25, secured thereto by the collars 26 and 27. The latter may be threaded upon the plunger 18, or secured thereto by set screws, or in any other convenient way. Arranged to be engaged by the cam member 25 when the injection plunger 18 nears the forward limit of its stroke is a limit switch 28, having a switch arm 29 mounted upon a fixed portion 30 of the machine. The limit switch 28 is of a normally open type adapted to be closed when the switch arm 29 is engaged by the cam member 25.

Feeding mechanism

Figure 3:
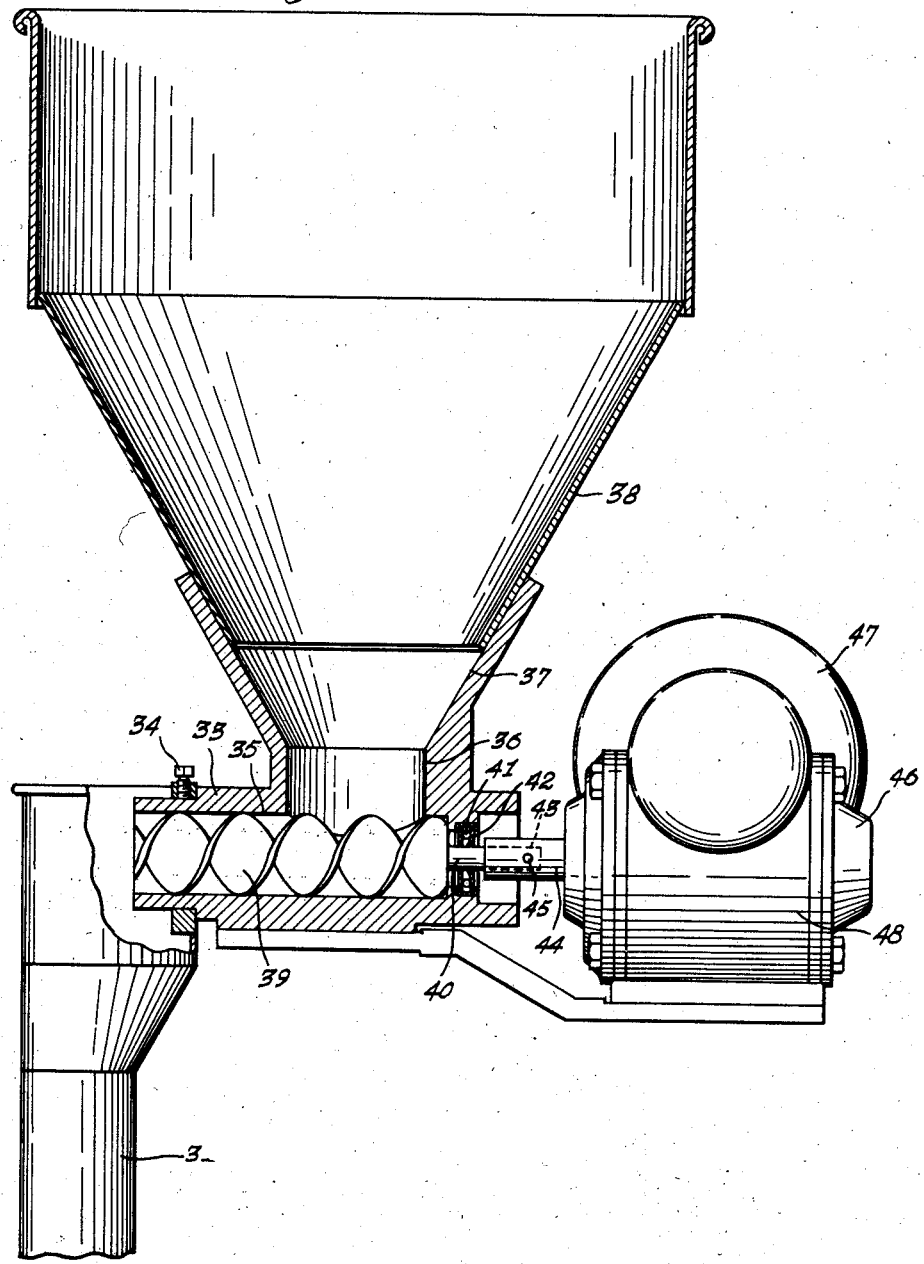
Figure 3 is an enlarged view, partly in section, of the feeding mechanism shown in Figure 1.

The feeding mechanism consists of a substantially vertical chute 31 opening, as at 32, into the injection chamber 11 and having a feed casing 33 secured thereto near the top thereof, as at 34 (Figure 3). The feed casing 33 contains a bore or chamber 35 having an inlet 36 opening into a conical receiver 37 for a funnel-shaped hopper 38. Operating in the feed chamber 35 is a feed screw 39 having a reduced shaft 40 supported by an antifriction bearing 41, having an oil check device 42 associated therewith. The shaft 40 terminates in the socket 43 of the motor assembly output shaft 44 and is interconnected therewith by the pin 45. The motor assembly 46 consists of an electric motor 47 and reduction gearing 48, causing the output shaft 44 to rotate at a greatly reduced speed in comparison with the speed of the motor itself.

Electrical system

Figure 2:
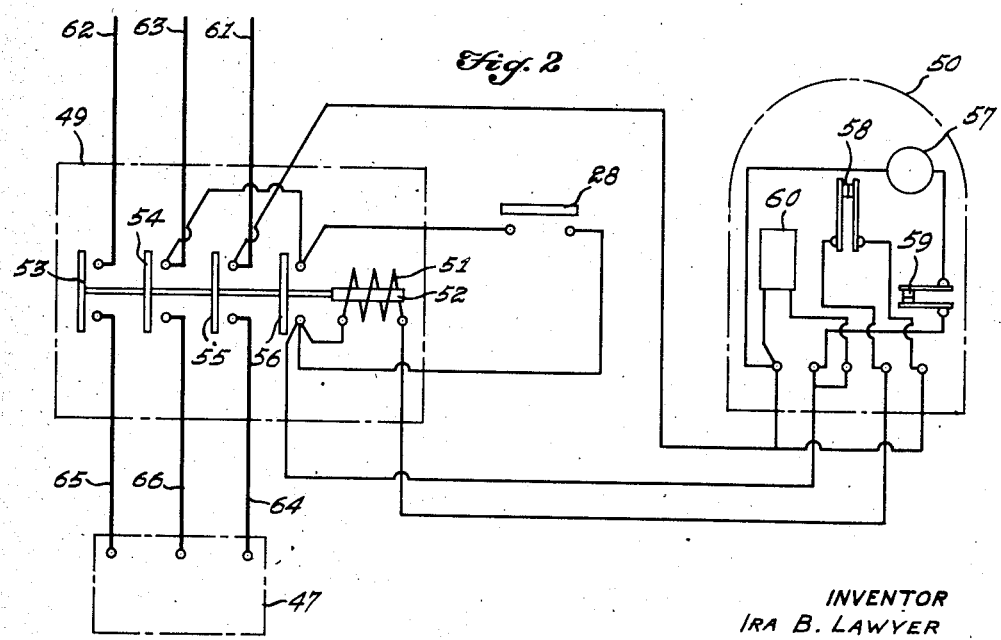
Figure 2 is a view showing the electrical wiring diagram of the electric circuit which controls the actuation of the feeding motor.

The electrical circuit for actuating the feeding motor 47 (Figure 2) consists of a four-pole magnetic switch 49, controlling the energization of the motor 47, the limit switch 28, already described, and an electrical timing switch 50 interconnected by appropriate wiring. The motor starting switch 49 includes an operating coil 51 having an armature 52 interconnecting and actuating the switch blades 53, 54, 55 and 56, and closing the switch 49 when the operating coil 51 is energized. The timing switch 50 consists of a timing motor 57, main contacts, generally designated 58, and auxiliary contacts, generally designated 59, and a coil 60 which operates a clutch (not shown) holding the main contacts 58 open, once they have opened, until the coil 60 is deenergized. When this occurs the timing switch 50 automatically resets itself, ready for the next operation.

The timing switch motor 57 is a synchronous motor which, in an adjustable predetermined time after it has started, opens the main contacts 58. The auxiliary contacts 59 open to stop the motor when the maximum time cycle for which the timing switch 50 is designed is reached, thereby preventing damage to the instrument. The timing switch 50 is provided with an adjusting knob (not shown), enabling the period of time to be varied according to any amount within the time cycle range of the instrument. The magnetic switch 49 is supplied with electricity from the power lines 61, 62 and 63, which continue beyond the switch in the motor lines 64, 65 and 66. When the switch blades 53, 54 and 55 are closed upon their respective contacts, the feed motor 47 is energized from the power lines 61, 62 and 63.

Operation

If it is desired to make an injection and feeding operation, pressure fluid is admitted through the port 23 (Figure 1) into the cylinder bore 22, where it causes the piston head 20 and the piston rod 21 to move to the left, causing the injection plunger 18 to make an injection stroke. This forces the plastic injection material within the injection chamber 11 out through the enlargement 13, past the deflector 12 and through the aperture 17 of the injector nozzle tip 16. When the injection plunger 18 nears the end of its working stroke, the cam 25 engages and shifts the switch arm 29, closing the switch blade of the limit switch 28 upon its contacts.

This action energizes the operating coil 51 of the magnetic switch 49 from the power line 63, through the now closed limit switch 28, the operating coil 51, the main contacts 58 of the timing switch 50, thence to the power line 61. The operating coil 51 thereupon shifts the armature 52 and closes the switch blades 53 to 56, inclusive. The closing of the switch blades 53, 54 and 55 energizes and starts the feeding motor 47 so that the feed screw 39 starts rotation. The molding material contained in the hopper 38 will therefore be forced to the left, into the vertical chute 31, and through the port 32, into the injector chamber 11 when the plunger 18 is retracted.

The timing motor 57 of the timing switch 50 is started by the closing of the switch blade 56, the latter action energizing the timing motor circuit from the line 63, through the switch blade 56, the auxiliary contacts 59, the timing motor 57 and the line running back to the power line 61. The timing motor runs for the length of time for which the timing switch 50 is set, and then opens the main contacts 58 thereof. This action breaks the circuit beginning at the power line 63, through the switch blade 56, the operating coil 51, the main contacts 58 of the timing switch 50 and the line running back to the power line 61.

The deenergization of the operating coil 51 permits the switch blades 53 to 56, inclusive, to fly open, under the influence of any suitable means, such as a spring (not shown), thereby deenergizing and stopping the feed motor 47. In case the limit switch 28 is still held closed the coil 60 of the timing switch prevents the timing switch 50 from being reset until the reverse movement of the injection plunger 18 shifts the cam 25 and releases the switch arm 29 of the limit switch 28.

By adjusting the timing switch the number of revolutions of the feed screw may be controlled, thereby controlling the amount of material measured out at one cycle of operation. The timing switch 28 may be adjusted in position along the fixed portion 30 so that it can be actuated at any desired location. The timing switch 50 is preferably adjusted in such a manner that slightly more material is fed at a single cycle of operation into the injection chamber 11 than can be used at one stroke of the injector plunger 18. Accordingly, the injector chamber 11 gradually fills up with material until the injection plunger 18 does not move inward far enough to permit the cam 25 to close the limit switch 28. When this occurs the feed motor circuit is not energized, hence, the feed motor 47 will not be operated and one feeding operation will be missed. This skip-stroke feeding arrangement thereby compensates for the slight over-feed which has caused a surplus of material to accumulate. In this way the injector chamber 11 is constantly assured of an adequate supply of injection material by the provision of a surplus amount fed thereto, and yet an accumulation of this surplus material is taken care of by the skip-feed arrangement.

It will be understood that I desire to comprehend within this invention such modifications as come within the scope of the claims and the invention.

Having thus fully described my invention, what I claim as new and desire to secure by Letters Patent, is:

1. In a feeding and injecting device, an injector chamber, an injection member therein, a substantially vertical passageway opening into said injector chamber, a feeding chamber connected to said passageway, a movable feeding member in said feeding chamber, a motor operatively connected to said feeding member for moving said feeding member, said motor including a motor energizing circuit, means for energizing said circuit, and a timing device responsive to the expiration of a predetermined period of time after the energization of said motor circut for deenergizing said motor circuit.

2. In a feeding and injecting device, an injector chamber, an injection member therein, a substantially vertical passageway opening into said injector chamber, a feeding chamber connected to said passageway, a movable feeding member in said feeding chamber, a motor operatively connected to said feeding member for moving said feeding member, said motor including a motor energizing circuit, means for energizing said circuit, a timing device responsive to the expiration of a predetermined period of time after the energization of said motor circuit for deenergizing said motor circuit, and a limit switch responsive to the travel of said injection member for controlling the energization of said motor circuit.

3. In a feeding and injecting device, an injector chamber, an injection member therein, a substantially vertical passageway opening into said injector chamber, a feeding chamber connected to said passageway, a movable feeding member in said feeding chamber, a motor operatively connected to said feeding member for moving said feeding member, said motor including a motor energizing circuit, means for energizing said circuit, a timing device responsive to the expiration of a predetermined period of time after the energization of said motor circuit for deenergizing said motor circuit, and a limit switch responsive to the travel of said injection member for controlling the energization of said motor circuit, said limit switch being positioned to be free from engagement and closing when said injection plunger fails to complete a working stroke.

4. In a feeding and injection device, an injector chamber, an injection member therein, a feeding chamber in communication with said injector chamber, a movable feeding member in said feeding chamber, a feeding motor connected to said feeding member for moving said feeding member, a circuit for energizing said feeding motor, means responsive to a predetermined motion of said injection member for energizing said feeding motor circuit, and a timing device responsive to the expiration of a predetermined period of time after the energization of said feeding motor circuit for deenergizing said feeding motor circuit whereby to feed a predetermined quantity of material to said injector chamber.

5. In a feeding and injection device, an injector chamber, an injection member therein, a feeding chamber in communication with said injector chamber, a movable feeding member in said feeding chamber, a feeding motor connected to said feeding member for moving said feeding member, a circuit for energizing said feeding motor, means responsive to a predetermined motion of said injection member for energizing said feeding motor circuit, and a timing device responsive to the expiration of a predetermined period of time after the energization of said feeding motor circuit for deenergizing said feeding motor circuit whereby to feed a predetermined quantity of material to said injector chamber, said timing means being connected to operate said feeding motor to supply a quantity of feeding material slightly in excess of the quantity required by said injector chamber, and said feeding-motor-energizing means being rendered inoperative in response to an incomplete stroke of said injection member, whereby to cause the accumulation of a predetermined quantity of surplus material to effect a skip cycle of operation of said feeding motor.

6. In a feeding and injection device, an injector chamber, an injection member therein, a feeding chamber in communication with said injector chamber, a movable feeding member in said feeding chamber, a feeding motor connected to said feeding member for moving said feeding member, a circuit for energizing said feeding motor, and a single limit switch in said circuit positioned to be operated to energize said feeding motor circuit in response to the execution of a substantially complete injection stroke of said injection member.

7. In a feeding and injection device, an injector chamber, an injection member therein, a feeding chamber in communication with said injector chamber, a movable feeding member in said feeding chamber, a feeding motor connected to said feeding member for moving said feeding member, a circuit for energizing said feeding motor, a limit switch in said circuit positioned to be operated to energize said feeding motor circuit in response to the execution of a substantially complete injection stroke of said injection member, and a timing device responsive to the expiration of a predetermined period of time after the energization of said feeding motor circuit for deenergizing said circuit, whereby to feed a predetermined quantity of material to said injector chamber.

8. In a feeding and injection device, an injector chamber, an injection member therein, a feeding chamber in communication with said injector chamber, a movable feeding member in said feeding chamber, a feeding motor connected to said feeding member for moving said feeding member, a circuit for energizing said feeding motor, and a single limit switch connected to control the energization of said feeding motor circuit and positioned to be shifted to energize said feeding motor circuit to execute a feeding cycle in response to the substantial completion of a stroke of said injection member.

9. In a feeding and injection device, an injector chamber, an injection member therein, a feeding chamber in communication with said injector chamber, a movable feeding member in said feeding chamber, a feeding motor connected to said feeding member for moving said feeding member, a circuit for energizing said feeding motor, and a single limit switch connected to control the energization of said feeding motor circuit and positioned to be shifted to energize said feeding motor circuit to execute a feeding cycle solely when said injection member substantially completes an injection stroke.

IRA B. LAWYER.